United States Patent
Uno et al.

(10) Patent No.: US 11,205,942 B2
(45) Date of Patent: Dec. 21, 2021

(54) MOTOR INCLUDING A BALANCE WEIGHT AND COMPRESSOR PROVIDED WITH THE SAME

(71) Applicant: Mitsubishi Electric Corporation, Tokyo (JP)

(72) Inventors: Ryohei Uno, Tokyo (JP); Koji Masumoto, Tokyo (JP); Yuki Tamura, Tokyo (JP); Kenjiro Motomura, Tokyo (JP); Yusuke Nakagawa, Tokyo (JP); Kei Iwata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/475,279

(22) PCT Filed: Mar. 22, 2017

(86) PCT No.: PCT/JP2017/011353
§ 371 (c)(1),
(2) Date: Jul. 1, 2019

(87) PCT Pub. No.: WO2018/173133
PCT Pub. Date: Sep. 27, 2018

(65) Prior Publication Data
US 2020/0007013 A1   Jan. 2, 2020

(51) Int. Cl.
*H02K 1/28*  (2006.01)
*H02K 15/16* (2006.01)
*H02K 15/03* (2006.01)
*H02K 1/27*  (2006.01)
*H02K 1/18*  (2006.01)
*F04B 17/03* (2006.01)
(Continued)

(52) U.S. Cl.
CPC ............ *H02K 15/03* (2013.01); *F04B 17/03* (2013.01); *F04B 35/04* (2013.01); *H02K 1/18* (2013.01);
(Continued)

(58) Field of Classification Search
CPC ............ H02K 1/28; H02K 1/276; H02K 7/04; H02K 7/02; H02K 15/03; H02K 15/165; H02K 15/16; F04B 17/03; F04B 35/04
(Continued)

(56) References Cited

U.S. PATENT DOCUMENTS 5,666,015  A  *  9/1997  Uchibori  ............... H02K 1/276
                                                    310/156.53
2003/0230948 A1* 12/2003  Murakami ............ H02K 1/276
                                                    310/156.53
(Continued)

FOREIGN PATENT DOCUMENTS

CN   205945295 U    2/2017
JP   09200986 A  *  7/1997
(Continued)

OTHER PUBLICATIONS

Machine translation of JP-09200986-A. (Year: 1997).*
(Continued)

*Primary Examiner* — Michael Andrews
(74) *Attorney, Agent, or Firm* — Posz Law Group, PLC (57) ABSTRACT

A motor includes an annular core formed by stacking a plurality of electromagnetic steel sheets; end plates disposed at both ends of the core in an axial direction; a balance weight disposed on a side of one of the end plates, the side being opposite the core; and a spacer disposed between the one of the end plates and the balance weight, the spacer being configured to create a space between the one of the end plates and the balance weight. The motor is entirely fastened by allowing at least one of a plurality of rivets arranged in a circumferential direction of the core to pass through the core and the end plates in the axial direction, and (Continued)

allowing remaining at least one rivet to pass through the core, the end plates, the spacer, and the balance weight in the axial direction.

6 Claims, 6 Drawing Sheets

(51) Int. Cl.
    *F04B 35/04*     (2006.01)
    *H02K 7/04*     (2006.01)

(52) U.S. Cl.
    CPC ............... *H02K 1/276* (2013.01); *H02K 7/04* (2013.01); *H02K 15/165* (2013.01)

(58) Field of Classification Search
    USPC ...... 310/156.08, 156.27, 156.28, 156.29, 81, 310/216.117
    See application file for complete search history.

(56) References Cited

U.S. PATENT DOCUMENTS

2014/0175930 A1* 6/2014 Adaniya ................ H02K 1/276
    310/156.11
2016/0329784 A1 11/2016 Tamura et al.

FOREIGN PATENT DOCUMENTS

| | | |
|---|---|---|
| JP | H09-200986 A | 7/1997 |
| JP | H11-262206 A | 9/1999 |
| JP | 2006-190080 A | 7/2006 |
| JP | 2006-304467 A | 11/2006 |
| JP | 2008-022601 A | 1/2008 |
| JP | 2009-225639 A | 10/2009 |
| JP | 2009225639 A * | 10/2009 |

OTHER PUBLICATIONS

Machine translation of JP-2009225639-A. (Year: 2009).*
International Search Report of the International Searching Authority dated May 30, 2017 for the corresponding International application No. PCT/JP2017/011353 (and English translation).
Office Action dated Sep. 25, 2020 issued in corresponding CN patent application No. 201780084221.3 (and English translation).
Chinese Office Action dated Apr. 15, 2021, issued in corresponding Chinese Patent Application No. 201780084221.3 (and English Machine Translation).
Decision of Rejection dated Oct. 11, 2021 issued in corresponding CN patent application No. 201780084221.3 ( and English translation).

* cited by examiner

FIG. 5    Comparative Example

FIG. 6    Comparative Example

Comparative Example

FIG. 9

MOTOR INCLUDING A BALANCE WEIGHT AND COMPRESSOR PROVIDED WITH THE SAME

CROSS REFERENCE TO RELATED APPLICATION

This application is a U.S. national stage application of PCT/JP2017/011353 filed on Mar. 22, 2017, the contents of which are incorporated herein by reference.

TECHNICAL FIELD

The present invention relates to a motor including a balance weight, and to a compressor provided with the motor.

BACKGROUND ART

In a compressor that compresses, for example, refrigerant, a motor and a compression mechanism are provided in a closed container. The motor includes a stator fixed to an inner peripheral surface of the closed container and a rotor rotatably supported in the stator. The rotor and the compression mechanism are coupled to each other by a shaft. A rotation force of the rotor is transmitted through the shaft to the compression mechanism, thereby causing the compression mechanism to compress refrigerant with the transmitted force.

An existing rotor includes, for example, an annular core formed by stacking a plurality of electromagnetic steel sheets, permanent magnets inserted in permanent magnet insertion holes provided in the core, and end plates provided at both ends of the core in an axial direction to prevent the permanent magnets from falling out of the permanent magnet insertion holes. The rotor further includes a balance weight for cancelling are centrifugal force generated at the compression mechanism. The balance weight is located outside the end plate at one end of the core in the axial direction. These components stacked and assembled together are fastened with a plurality of rivets to form the rotor (see, for example, Patent Literature 1).

In Patent Literature 1, the rotor and the shaft are connected by shrink fitting. That is, after a heating coil is inserted into a shaft insertion hole formed in the center of the core, high-frequency current is supplied to the heating coil to heat the rotor, whereby that the shaft insertion hole in the core is thermally expanded. The shaft is then inserted into the expanded shaft insertion hole, and fixed.

CITATION LIST

Patent Literature

Patent Literature 1: Japanese Unexamined Patent Application Publication No. 2008-22601

SUMMARY OF INVENTION

Technical Problem

In Patent Literature 1, in a core, a side where a balance weight is provided is different from a side where the balance weight is not provided, with respect to the amount of contraction of the core in the axial direction, which occurs from the time when components are not yet fastened with rivets to the time when the components are fastened with the rivets. Therefore, the straightness of the shaft insertion hole is deteriorated. If the straightness of the shaft insertion hole is deteriorated, it is not possible to ensure a sufficient clearance between the shaft insertion hole and the shaft during shrink fitting of the shaft, thus causing poor shrink fitting.

The present invention has been made to solve the above problems, and an object of the invention is to provide a motor in which deterioration of the straightness of a shaft insertion hole in a rotor is reduced, and to also provide a compressor provided with the motor.

Solution to Problem

A motor according to the embodiment of the present invention includes: an annular core formed by stacking a plurality of electromagnetic steel sheets; end plates provided at both ends of the core in an axial direction thereof; a balance weight provided on an opposite side of a side of one of the end plates, which faces the core; and a spacer disposed between the one of the end plates and the balance weight, the spacer being configured to provide space between the one of the end plates and the balance weight. One or more of a plurality of rivets are inserted into the core and the end plates in the axial direction, and a remaining one or more of the plurality of rivets are inserted into the core, the end plates, the spacer and the balance weight in the axial direction, such that the plurality of rivets are arranged in a circumferential direction of the core, thereby fastening the core, the end plates, the spacer and the balance weight.

A compressor according to another embodiment of the present invention includes the motor described above and a compression mechanism coupled to the motor by a shaft and configured to compress refrigerant with a driving force transmitted to the compression mechanism from the motor through the shaft.

Advantageous Effects of Invention

In the embodiment of the present invention, all components are fastened with rivets. On a balance weight side of a core, the spacer provided at the balance weight is brought into contact with one of the end plates, and the components are fastened to the core with the rivets, and on a non-balance weight side of the core, the rivets are brought into contact with the above one of the end plates, and the components are fastened to the core. It is therefore possible to balance a rivet fastening load of the rivets on the balance weight side and that on the non-balance weight side, and reduce deterioration of straightness of the shaft insertion hole in the center of the core.

DESCRIPTION OF THE EMBODIMENT

An embodiment of the present invention will be described with reference to the drawings.

Embodiment

Figure 1:
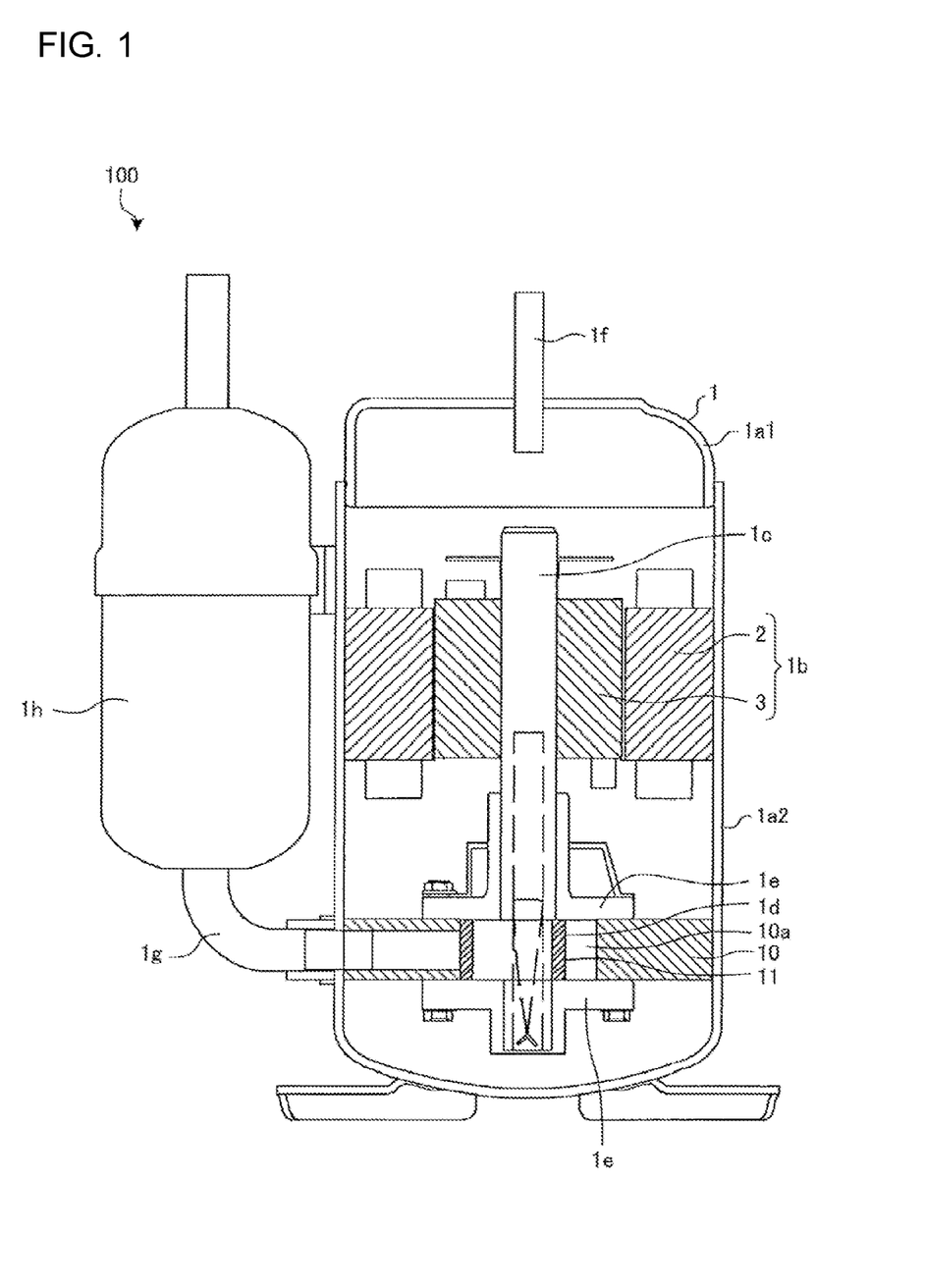
FIG. 1 is a schematic view illustrating an example of a configuration of a compressor 100 provided with a motor 1b according to an embodiment of the present invention.

FIG. 1 is a schematic view illustrating an example of a configuration of a compressor 100 provided with a motor 1b according to an embodiment of the present invention.

In the motor 11b according to the embodiment, a balance weight of a rotor 3 is formed to have a characteristic shape, and is thereby improved to eliminate factors in a failure in shrink fitting which occurs when a shaft 1c is shrink-fitted into the rotor 3 with high-frequency heating.

[Description of Configuration]

In the compressor 100, the motor 1b and a compression mechanism 1d are provided in a closed container 1, and a liquid container 1h is located outside the closed container 1 and connected to the closed container 1. To the closed container 1, a suction pipe 1g and a discharge pipe 1f are connected. The suction pipe 1g allows refrigerant to be supplied into the closed container 1, and the discharge pipe 1f allows compressed refrigerant to be discharged from the closed container 1.

(Closed Container 1)

The closed container 1 forms an outer periphery of the compressor 100. The closed container 1 includes an upper shell 1a1 and a lower shell 1a2. The upper shell 1a1 is an end-side shell which forms an upper portion of the closed container 1. For example, the upper shell 1a1 is formed in the shape of a bowl by, for example, drawing. Although it is not illustrated, a glass terminal for use in supply of current to the motor 1b is provided at the upper shell 1e1.

The lower shell 1a2 forms an intermediate portion and a lower portion of the closed container 1. For example, the lower shell 1a2 is formed in the shape of a cylinder which has a bottom, that is, which is closed on the lower side thereof. To be more specific, the upper side of the lower shell 1a2 has an opening into which the upper shell 1a1 is press-fitted, and the lower side of the lower shell 1a2 is closed to store refrigerating machine oil which is applied to reduce a sliding friction of the compression mechanism 1d.

(Suction Pipe 1g and Liquid Container 1h)

One of ends of the suction pipe 1g is connected to the lower shell 1a2 of the closed container 1 to communicate with a cylinder 10 (to be described later) of the compression mechanism 1d. The other end of the suction pipe 1g is connected to the liquid container 1h. The liquid container 1h serves as an accumulator capable of storing liquid refrigerant. The liquid container 1h also serves as a muffler that reduces, for example, noise of refrigerant flowing into the compressor 100.

(Discharge Pipe 1f)

The discharge pipe 1f is a pipe that allows high-temperature, high-pressure refrigerant compressed by the compression mechanism 1d to be discharged from the closed container 1. One of ends of the discharge pipe 1f is connected to, for example, a four-way valve (not illustrated) which is applied to switch a flow passage between plural flow passages, and the other end of the discharge pipe 1f is connected to the upper shell 1a1, whereby the inside and the outside of the closed container 1 communicate with each other.

(Compression Mechanism 1d)

The compression mechanism 1d is coupled to the motor 1b by the shaft 1c. The compression mechanism 1d compresses refrigerant with a driving force which is transmitted from the motor 1b to the compression mechanism 1d through the shaft 1c, and discharges the compressed refrigerant into the closed container 1. The compression mechanism 1d is attached to an inner peripheral surface of the lower shell 1a2. The compression mechanism 1d is a rolling piston type compression mechanism, and includes the cylinder 10, a piston 11 and vanes (not illustrated). The cylinder 10 is formed of a flat plate and has a substantially cylindrical through-hole which is formed in a substantially center portion of the cylinder 10 to extend in a vertical direction. Both ends of the through-hole in an axial direction thereof are closed by bearings 1e that support the shaft 1c to allow the shaft 1c to rotate. A cylindrical cylinder chamber 10a is formed in the cylinder 10.

The piston 11 is provided in the cylinder chamber 10a. The piston 11 is ring-shaped, and rotatably fitted in an eccentric shaft portion of the shaft 1c. As the shaft 1c rotates, the piston 11 eccentrically moves in the cylinder chamber 10a. The cylinder chamber 10a is supplied with refrigerant from the liquid container 1h through the suction pipe 1g. The refrigerant is compressed and discharged into the closed container 1, as the piston 11 eccentrically moves in the cylinder chamber 10a. Although it is described above that the compression mechanism 1d of the embodiment is a rolling piston type compression mechanism 1d, the compression mechanism 1d is not limited to the rolling position compression mechanism, and it may be a scroll type compression mechanism.

(Motor 1b)

The motor 1b includes the rotor 3 which is fixed to the shaft 1c and the stator 2 which rotates the rotor 3 with a rotating magnetic field. In the closed container 1, the motor 1b is provided above the compression mechanism 1d. The stator 2 is fixed to the inner periphery of the lower shell 1a2 of the closed container 1, and located above the compression mechanism 1d. The rotor 3 is supported such that the rotor 3 is located inward of the stator 2 and apart from the stator 2 by a predetermined distance. The configuration of the rotor 3 will now be described in detail.

[Detailed Description of Rotor 3]

Figure 2:
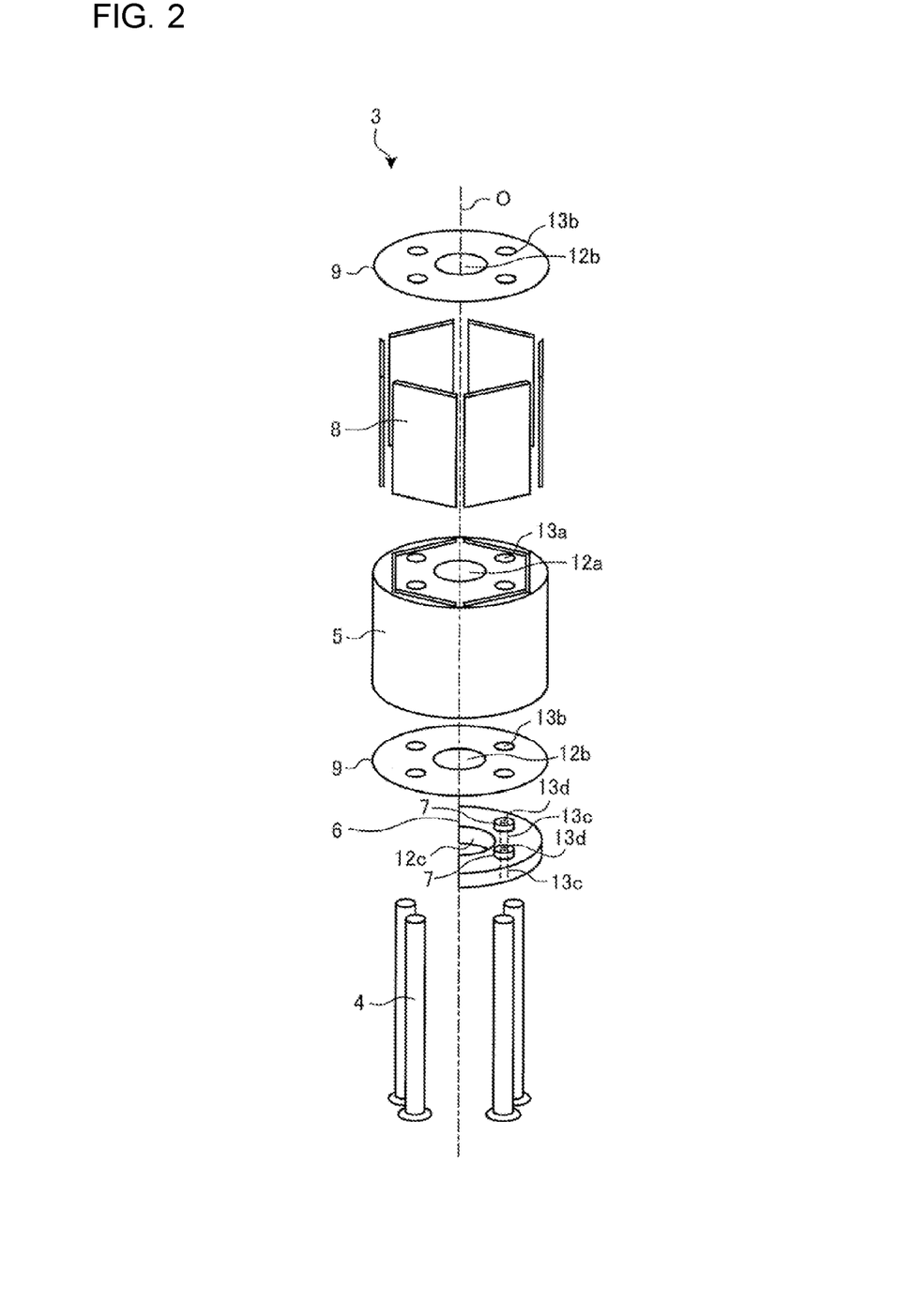
FIG. 2 is an exploded schematic perspective view of a rotor 3 of the motor 1b according to the embodiment of the present invention.
Figure 3:
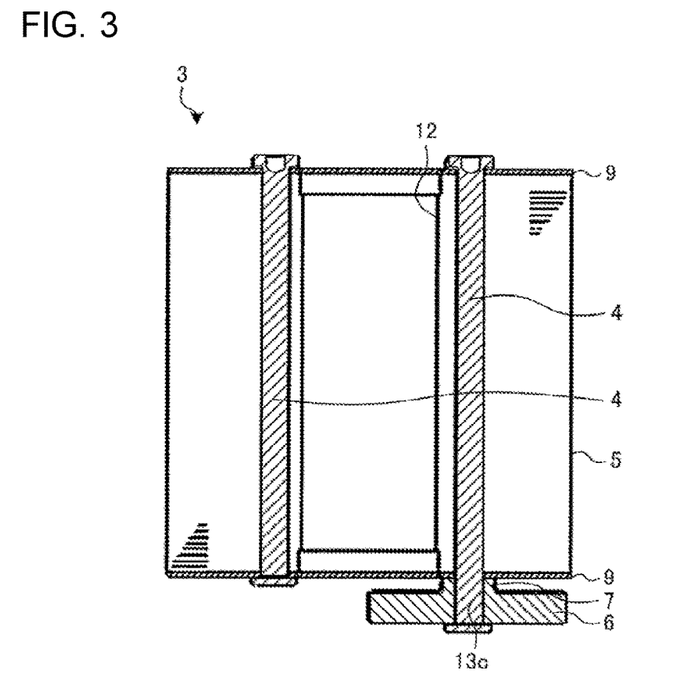
FIG. 3 is a schematic cross-sectional view of the rotor 3 of the motor 1b, which is taken at rivet insertion holes, in the embodiment of the present invention.
Figure 4:
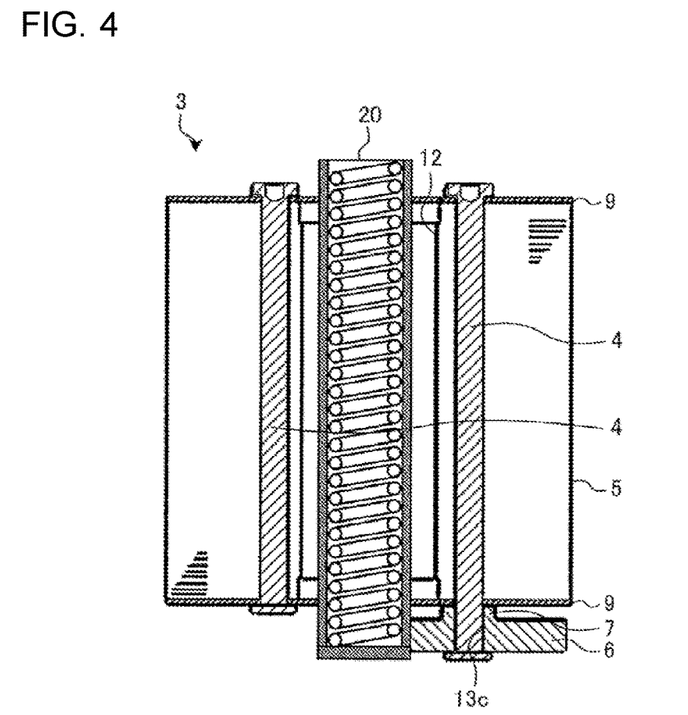
FIG. 4 is an explanatory diagram illustrating the process of shrink fitting of a shaft 1c into the rotor 3 of the motor 1b using high-frequency heating in the embodiment of the present invention.

FIG. 2 is an exploded schematic perspective view of the rotor 3 of the motor 1b according to the embodiment of the present invention. FIG. 3 is a schematic cross-sectional view of the rotor 3 of the motor 1b, which is taken at rivet insertion hole, in the embodiment of the present invention. FIG. 4 is an explanatory diagram illustrating the process of shrink fitting of the shaft 1c into the rotor 3 of the motor 1b using high-frequency heating in the embodiment of the present invention.

The rotor 3 includes an annular core 5 formed by stacking a plurality of electromagnetic steel sheets, permanent magnets 8 and end plates 9 disposed at both ends of the core 5 in the axial direction thereof. In each of the electromagnetic steel sheets, caulking portions 5a for joining using caulking which are, for example, V-shaped (see FIG. 6 to be referred to later) are formed in advance in the process of die cutting of each electromagnetic sheet. The electromagnetic steel sheets are joined together by applying a crimp force to the caulking portions 5a. Hereinafter, portions of the caulking portions 5a which are fixed by caulking will be referred to as stacked caulking portions 5a. In an example illustrated in the figure, six stacked caulking portions 5a are concentrically arranged at regular intervals about a central axis O of the core 5.

The core 5 has six permanent magnet insertion holes 3a into which the respective permanent magnets 8 are inserted. At a center portion of the core 5, a shaft insertion hole 12a is formed, and the shaft 1c is inserted into the shaft insertion hole 12a. Around the shaft insertion hole 12a of the core 5, rivet insertion holes 13a are formed, and respective rivets 4 (to be described later) are inserted into the rivet insertion holes 13a. The rivet insertion holes 13a are concentrically arranged about a central axis O at regular intervals, and in the example illustrated in the figure, four rivet insertion holes 13a are arranged.

The end plates 9 are provided to prevent the permanent magnets 8 from falling out of the permanent magnet insertion holes 3a. The end plates 9 have respective shaft insertion holes 12b and rivet insertion holes 13b that face the shaft insertion hole 12a and the rivet insertion holes 13a of the core 5.

At one of the end plates 9, which is the end plate 9 on the lower side in the example, a balance weight 6 is provided to maintain the rotation accuracy of the rotor 3. To be more specific, the balance weight 6 is located on an opposite side of a side of the above end plate 9 which faces the core 5. The balance weight 6 is substantially semi-cylindrically shaped and provided to cancel a centrifugal force generated around the shaft 1c during eccentric rotation in the compression mechanism 1d. The balance weight 6 has rivet insertion holes 13c that face the respective rivet insertion holes 13b of the above end plate 9. The balance weight 6 has a shaft insertion hole 12c in an inner portion of the balance weight 6. Although the balance weight 6 is generally formed of a non-magnetic material or a diamagnetic material that does not affect a magnetic field, the material of the balance weight 6 is not specifically limited. The rotor 3 is configured such that because of provision of the balance weight 6, a balance weight side and a non-balance weight side are asymmetric with respect to a plane including the central axis O.

A characteristic configuration of the embodiment resides in that spacers 7 are disposed between the above end plate 9 and the balance weight 6. The spacers 7 are arranged in such a manner as to avoid the stacked caulking portions 5a. In the example, the spacers 7 are formed integrally with the balance weight 6 by such a manufacturing method as sintering. Although it is described above that the spacers 7 are formed integrally with the balance weight 6, the spacers 7 and the balance weight 6 may be formed as separate components. The spacers 7 have rivet insertion holes 13d that face the respective rivet insertion holes 13c of the balance weight 6.

The components having the above configurations are stacked in the axial direction such that the rivet insertion holes 13a to 13d communicate with each other in the axial direction. By inserting the rivets 4 into the rivet insertion holes 13a to 13d communicating with each other, all the stacked components are fastened by caulking to form the rotor 3. To be more specific, on the non-balance weight side, the rivets 4 are inserted into the core 5 and the end plate 9 in the axial direction, and on the balance weight side, the rivets 5 are inserted into the core 5, the end plate 9, the spacers 7 and the balance weight 6 in the axial direction, thereby fastening all the stacked components together.

The two rivet insertion holes 13c in the balance weight 6 are formed symmetric with respect to a straight line which extends in a radial direction as a center line which extends through the center of the balance weight 6 in a circumferential direction. Therefore, the spacers 7 having the rivet insertion holes 13d that communicate with the respective rivet insertion holes 13c of the balance weight 6 are arranged at the balance weight 6 at the same positions as the rivet insertion holes 13c. Furthermore, in the entire rotor 3, the rivets 4, which are four rivets 4 in the example, are concentrically arranged at regular intervals about the central axis O. Therefore, the positions where the components are fastened by the rivets 4 are also located at regular intervals, and they are thus fastened in a balanced manner. Although it is described above that the number of rivets for fastening the components of the entire rotor is four in the example, it is not limited to four, that is, it can be arbitrary set.

In the rotor 3, after the components are fastened, the shaft insertion holes 12a, 12b and 12c communicate with each other to form a shaft insertion hole 12 (see FIGS. 3 and 4). A heating coil 20 is inserted into the shaft insertion hole 12, and the core 5 is heated by supplying high-frequency current to the heating coil 20. As a result of heating of the core 5, the shaft insertion hole 12 is expanded, and the shaft 1c is inserted into the expanded shaft insertion hole 12. Then, when the core 5 cools off, the shaft insertion hole 12 contracts, thereby fixing the shaft 1c and the rotor 3 to each other.

[Description of Role of Spacers 7]

The role of the spacers 7 of the embodiment will be described. In order to clarify the role of the spacers 7 of the embodiment, a rotor 30 having no spacer 7 will be described as a comparative example, and the roll of the spacers 7 of the embodiment will be described based on the comparison between the embodiment and the comparative example.

Figure 5:
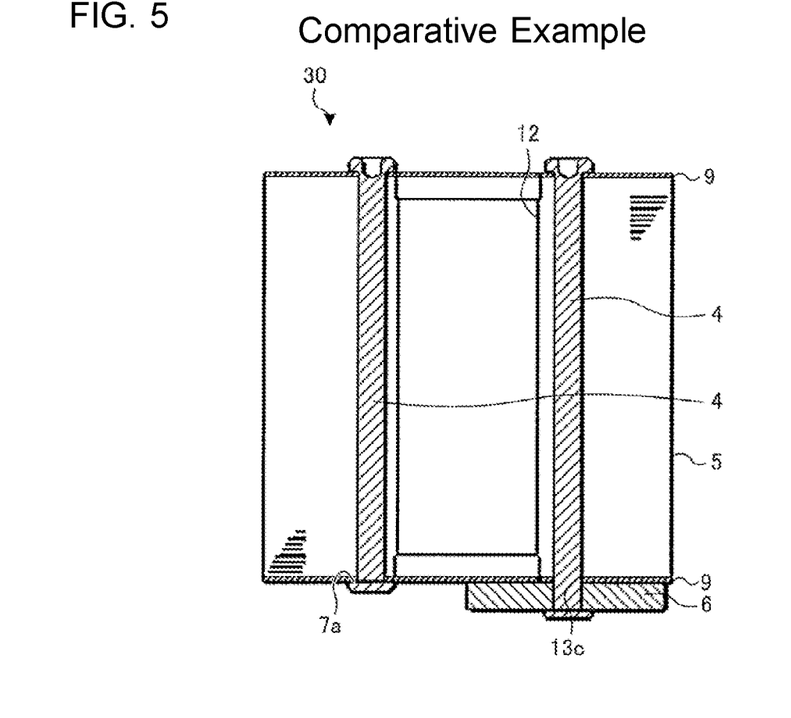
FIG. 5 is a schematic cross-sectional view of the rotor 30 of the comparative example, which is taken at rivet insertion holes.
Figure 6:
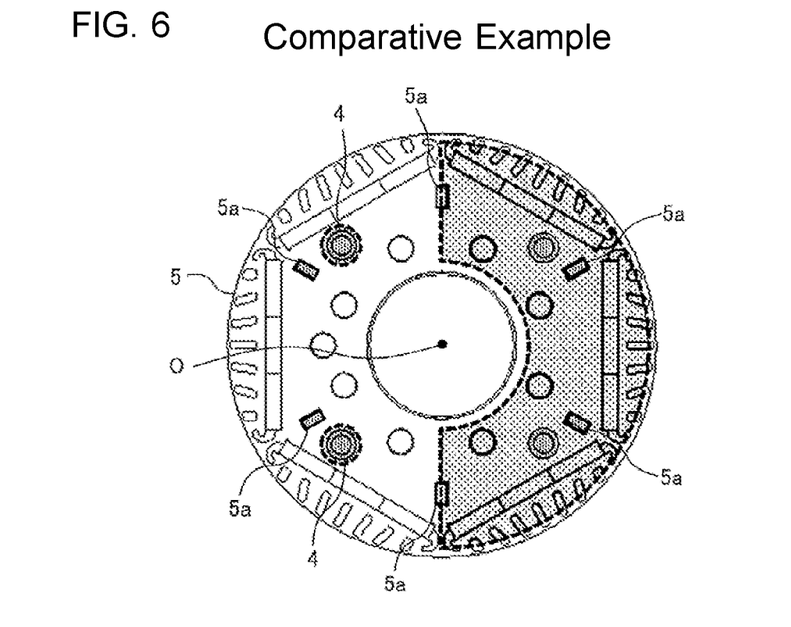
FIG. 6 illustrates an area on which a rivet fastening load acts in a caulked state of the rotor 30 of a comparative example.

First, with reference to FIGS. 5 and 6, fastening of components of the rotor 30 of the comparative example with rivets will be described. FIG. 5 is a schematic cross-sectional view of the rotor 30 of the comparative example, which is taken at rivet insertion holes. FIG. 6 illustrates an area on which a rivet fastening load of the rivets acts in a caulked state of the rotor 30 of the comparative example. In FIG. 6, a dotted area indicates the area on which the rivet fastening load acts.

In the rotor 30 of the comparative example, since no spacer 7 is provided, the entire balance weight 6 is brought into contact with an end plate 9 when components of the entire rotor 30 are fastened with rivets 4. Therefore, as illustrated in FIG. 6, the rivet fastening load is applied to the entire surface of the balance weight 6, and acts on the stacked caulking portions 5a of the core 5. In the lower portion of the rotor 30, on a non-balance weight side where the balance weight 6 is not provided, bearing surfaces 7a of the rivets 4 are brought into contact with the end plate 9. Therefore, on the non-balance weight side, the rivet fastening load acts on the bearing surfaces 7a of the rivets 4 which are brought in contact with the end plate 9. That is, on the non-balance weight side, the rivet fastening load does not act on the stacked caulking portions 5a of the core 5.

In such a manner, the balance weight side and the non-balance weight side are different from each other in the area on which the rivet fastening load acts. Therefore, the balance weight side and the non-balance weight side are also different from each other in the amount of contraction of each of stacked caulking portions 5a in the axial direction 5a, which occurs from the time when the components are not yet fastened with the rivets 4 to the time when the components are fastened with the rivets 4, thus deteriorating the straightness of the shaft insertion hole 12a in the core 5.

Figure 7:
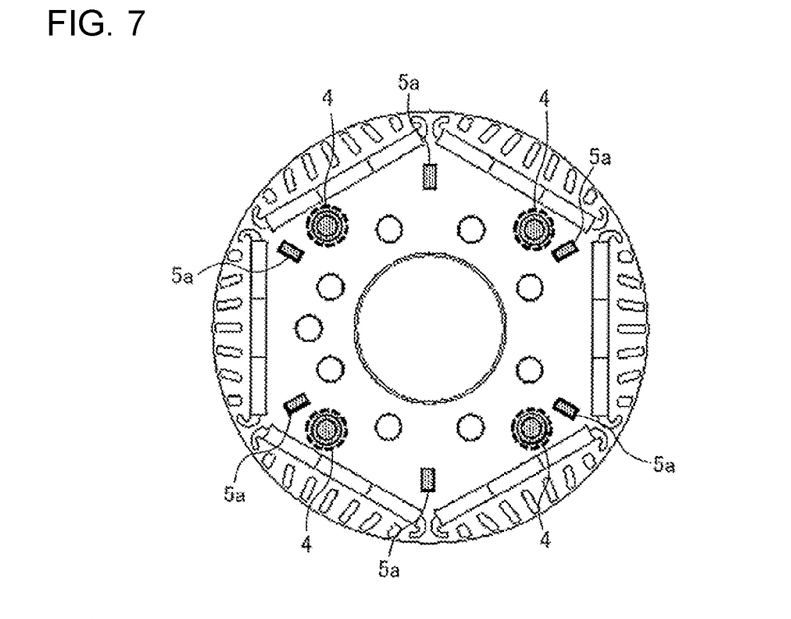
FIG. 7 illustrates an area on which a rivet fastening load acts in a rivet-fastened state of the rotor 3 of the motor 1b according to the embodiment of the present invention.

Next, with respect to the rotor 3 including the spacers 7 in the embodiment, fastening of the components with rivets will be described. FIG. 7 illustrates an area on which the rivet fastening load acts in a rivet-fastened state of the rotor 3 of the motor 1b in the embodiment of the present invention, in which the components of the rotor 3 are fastened with the rivets.

The rotor 3 of the embodiment includes the spacers 7 as described above. Thus, in the rivet-fastened state, on the balance weight side, the spacers 7 are in contact with the end plate 9. Thus, the rivet fastening load acts on upper surfaces of the spacers 7 which are in contact with the end plate 9, and does not act on the stacked caulking portions 5a of the core 5. By contrast, on the non-balance weight side, the rivet fastening load is applied to the bearing surfaces 7a of the rivets 4 which are in contact with the end plate 9. That is, on the non-balance weight side, the rivet fastening load does not act on the stacked caulking portions 5a of the core 5. Therefore, the amount of contraction of each of stacked caulking portions 5a in the axial direction on the balance weight side in the axial direction is not different from that on the non-balance weight side, and it is therefore possible to reduce deterioration of the straightness of the shaft insertion hole 12a in the core 5.

In such a manner, since the deterioration of straightness of the shaft insertion hole 12a can be reduced, it is possible to reduce occurrence of poor shrink fitting which is caused by deterioration of straightness. In order to further reduce deterioration of the straightness of the shaft insertion hole 12a, it is preferable that the areas of the bearing surfaces 7a of the rivets 4 be equal to contact areas between the spacers 7 and the end plate 9.

[Temperature Distribution in Core During High-Frequency Heating Based on Structural Feature of Rotor 3]

The role of the spacers 7 function during high-frequency heating of the rotor 3 will be described. This description is also made based on the comparison between the rotor 3 and the rotor 30 of the comparative example in which no spacer 7 is provided.

Figure 8:
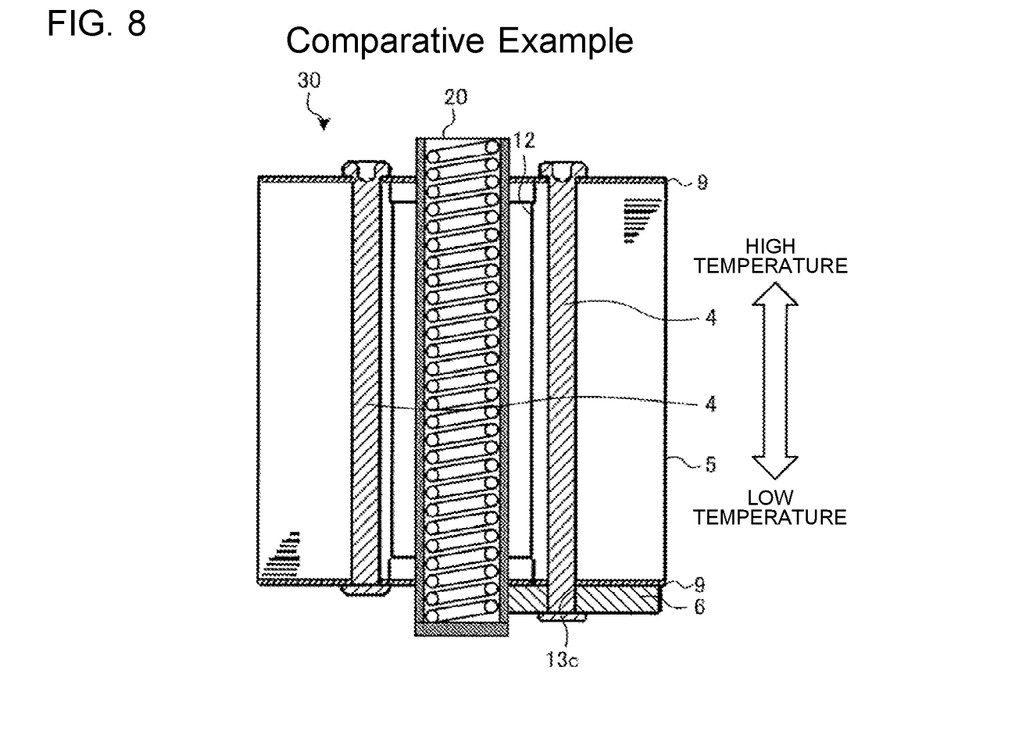
FIG. 8 is an explanatory diagram illustrating a temperature distribution in the core 5 during high-frequency heating in the rotor 30 of the comparative example.

FIG. 8 is an explanatory diagram illustrating a temperature distribution in the core 5 during high-frequency heating in the rotor 30 of the comparative example.

In the rotor 30 of the comparative example, since the entire balance weight 6 is brought into contact with the end plate 9, the heat of the core 5 which is generated by a high-frequency magnetic field from a heating coil 20 is rapidly absorbed by the entire balance weight 6 through the end plate 9. Consequently, the temperature of the lower part of the core 5 is decreased lower than that of the upper part of the core 5, as a result of which the temperature of the core 5 varies from one part to another in the axial direction of the core 5. Inevitably, the amount of thermal expansion of the shaft insertion hole 12a varies from one part to another in the axial direction. Furthermore, since the permanent magnets 8 included in the rotor 30 have a temperature limit, heating conditions need to be set in consideration of the upper temperature limit of the upper part of the rotor, and the lower part of the rotor is not sufficiently heated. Therefore, it is not possible to ensure a sufficient clearance for shrink fitting in the lower part of the rotor, thus causing poor shrink fitting.

Figure 9:
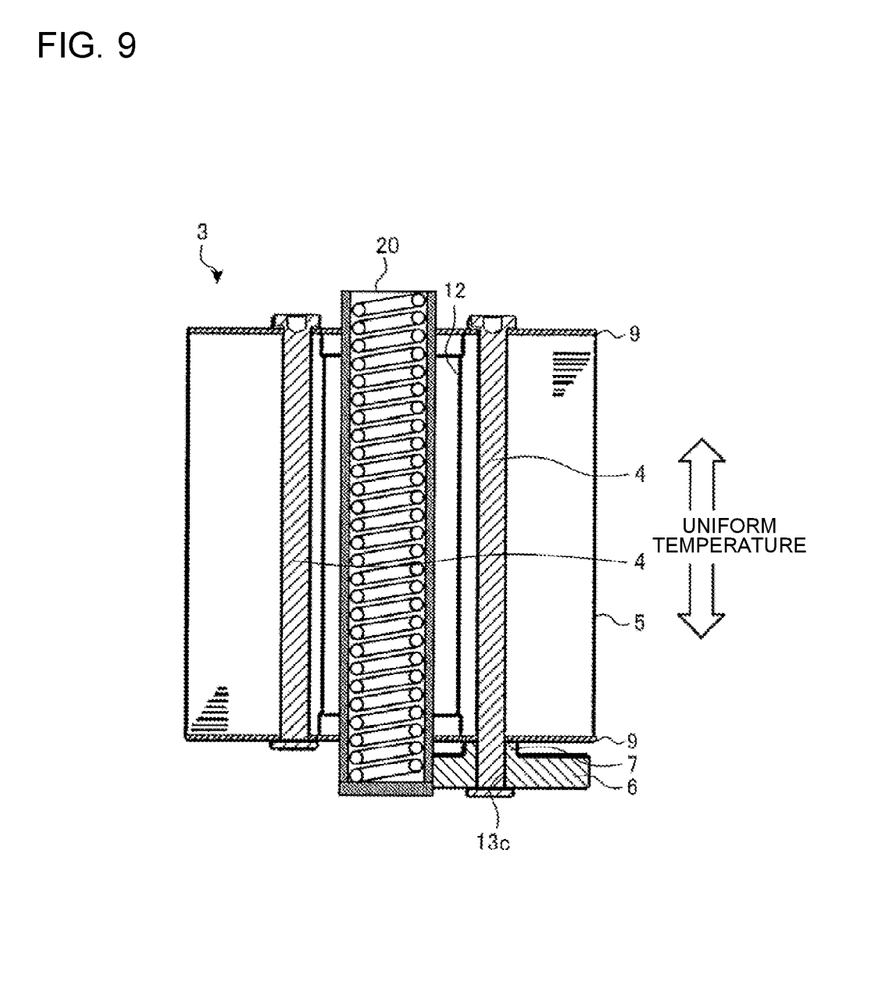
FIG. 9 is an explanatory diagram illustrating a temperature distribution in the core 5 during high-frequency heating in the rotor 3 of the motor 1b according to the embodiment of the present invention.

FIG. 9 is an explanatory diagram illustrating a temperature distribution in the core 5 during high-frequency heating in the rotor 3 of the motor 1b according to the embodiment of the present invention.

In the rotor 3 of the embodiment, since the spacers 7 are brought into contact with the end plate 9, the balance weight 6 is kept away from the end plate 9, and the spacers 7 serve as thermal shield spacers. In addition, at the balance weight 6, the spacers 7 are brought into contact with the end plate 9, and the contact area between the spacers 7 and the end plate 9 is smaller than the contact area between the balance weight 6 and the end plate 9 in the comparative example. It is therefore possible to reduce a phenomenon in which the heat of the core 5 which is generated by the high-frequency magnetic field from the heating coil 20 is absorbed by the entire balance weight 6 through the end plate 9. As a result, the temperature of the core 5 is uniform from the lower part to the upper part in the axial direction. It is therefore possible to uniformize the amount of thermal expansion of the entire shaft insertion hole 12a in the core 5, thus ensuring a sufficient clearance for shrink fitting in the shaft insertion hole 12a, and facilitate insertion of the shaft 1c into the shaft insertion hole 12a.

As described above, in the embodiment, the spacers 7 are provided between the balance weight 6 and the end plate 9. Thus, the spacers 7 provided at the balance weight 6 are brought into contact with the end plate 9, and in this state, the components are fastened with the rivets. Therefore, on the balance weight side where the balance weight 6 is provided, the fastening load of the rivets 4 acts only on the spacers 7, that is, it acts only to limited locations. Thus, the fastening load of the rivets 4 does not act on the stacked caulking portions 5a. It is therefore possible to balance the fastening load of the rivets 4 on the balance weight side and that on the non-balance weight side, and reduce deterioration of the straightness of the shaft insertion hole 12a.

In the process of shrink-fitting the shaft 1c by performing high-frequency heating on the rotor 3, the spacers provided at the balance weight 6 are brought into contact with the end plate 9, and the balance weight 6 itself is kept away from the end plate 9. The spacers 7 thus serve as thermal shield spacers, thus reducing a phenomenon in which heat generated in the core 5 is absorbed by the balance weight 6. Thus, the temperature of the core 5 is uniformized from the lower part to the upper part in the axial direction, and the amount of thermal expansion of the entire shaft insertion hole 12a in the core 5 is also uniformized. As a result, the shaft 1c can be more easily inserted into the shaft insertion hole 12a, and it is also possible to reduce occurrence of poor shrink fitting.

Since the spacers 7 are arranged in such a manner as to avoid the stacked caulking portions 5a, it is possible to prevent the fastening load of the rivets 4 at the spacers 7 from acting on the stacked caulking portions 5a.

The balance weight 6 has a semi-cylindrical shape, and the spacers 7 are arranged symmetrically with respect to a straight line which extends in the radial direction as a center line which extends through the center of the balance weight 6 in the circumferential direction. It is therefore possible to balance the fastening load acting on the balance weight 6. Since the spaces 7 are arranged in the above manner, the number of two spacers 7 is two or more.

Since the rivets 4 are concentrically arranged at regular intervals about the central axis O of the core 5, the positions where the components are fastened with the rivets are also located at regular intervals. Therefore, the components can be fastened in a balanced manner.

Furthermore, in embodiment, the balance weight 6 and the spacers 7 are integrally formed, and the spacers 7 can be formed at low cost by such a manufacturing method as sintering. Therefore, the manufacturing cost can be reduced, as compared with the case where the spacers 7 and the balance weight 6 are manufactured as separate elements. Also, the configuration of the embodiment is a configuration made simply by adding the spacers 7 to an existing balance weight 6. Therefore, it is possible, without increasing the manufacturing cost, to reduce deterioration of straightness of the shaft insertion hole 12a and reduce unevenness of the temperature distribution in the core 5 during high-frequency heating.

REFERENCE SIGNS LIST 1 closed container 1a1 upper shell 1a2 lower shell 1b motor 1c shaft 1d compression mechanism 1e bearing 1f discharge pipe 1g suction pipe 1h liquid container 2 stator 3 rotor 3a permanent magnet insertion hole 4 rivet 5 core 5a caulking portion (multilayer caulking portion) 6 balance weight 7 spacer 7a bearing surface 8 permanent magnet 9 end plate 10 cylinder 10a cylinder chamber 11 piston 12 shaft insertion hole 12a shaft insertion hole 12b shaft insertion hole 12c shaft insertion hole 13a rivet insertion hole 13b rivet insertion hole 13c rivet insertion hole 13d rivet insertion hole 20 heating coil 30 rotor 100 compressor O central axis

The invention claimed is:

1. A motor comprising:
   an annular core formed by stacking a plurality of electromagnetic steel sheets;
   end plates provided at both ends of the core in an axial direction thereof;
   a balance weight provided on an opposite side of a side of one of the end plates that faces the core; and
   a spacer provided between the one of the end plates and the balance weight, the spacer being configured to provide space between the one of the end plates and the balance weight, one of end faces of the spacer being in contact with the balance weight,
   wherein one or more of a plurality of rivets are inserted into the core and the end plates in the axial direction, and a remaining one or more of the plurality of rivets are inserted into the core, the end plates and the balance weight in the axial direction, such that the plurality of rivets are arranged in a circumferential direction of the core thereby fastening the core, the end plates, the spacer and the balance weight, and
   contact areas between bearing surfaces of the one or more rivets and the one of the end plates are equal to contact areas between the spacer and the one of the end plates.

2. The motor of claim 1, wherein the core has stacked caulking portions at which the electromagnetic steel sheets are fixed to each other by caulking, and the spacer is provided in such a manner as to avoid the stacked caulking portions.

3. The motor of claim 1, wherein
   the balance weight has a semi-cylindrical shape; and
   at least two spacers are arranged symmetrically with respect a straight line which extends in a radial direction through a center of the balance weight in a circumferential direction.

4. The motor of claim 1, wherein the rivets are concentrically arranged at regular intervals about a central axis of the core.

5. The motor of claim 1, wherein
   the motor is included in a compression mechanism, which is coupled to the motor by a shaft, and
   the compression mechanism is configured to compress refrigerant with a driving force transmitted to the compression mechanism from the motor through the shaft.

6. The motor of claim 1, wherein the spacer is formed integrally with the balance weight.

* * * * *